(12) United States Patent
Tojigamori et al.

(10) Patent No.: US 9,397,336 B2
(45) Date of Patent: Jul. 19, 2016

(54) BATTERY ACTIVE MATERIAL COMPRISING A CRYSTAL PHASE HAVING A RUDDLESDEN-POPPER STRUCTURE AND BATTERY INCLUDING THE SAME

(71) Applicants: Takeshi Tojigamori, Susono (JP); Hideki Oki, Tokyo-to (JP)

(72) Inventors: Takeshi Tojigamori, Susono (JP); Hideki Oki, Tokyo-to (JP)

(73) Assignee: TOYTA JIDOSHA KABUSHIKI KAISHA, Toyota (JP)

( * ) Notice: Subject to any disclaimer, the term of this patent is extended or adjusted under 35 U.S.C. 154(b) by 124 days.

(21) Appl. No.: 14/103,375

(22) Filed: Dec. 11, 2013

(65) Prior Publication Data

US 2014/0170495 A1 Jun. 19, 2014

(30) Foreign Application Priority Data

Dec. 18, 2012 (JP) ................................ 2012-275393

(51) Int. Cl.
*H01M 4/02* (2006.01)
*H01M 4/58* (2010.01)
*H01M 4/36* (2006.01)
*C01G 23/00* (2006.01)
*H01M 4/485* (2010.01)
*H01M 4/136* (2010.01)
*H01M 10/052* (2010.01)
*H01M 10/0562* (2010.01)

(52) U.S. Cl.
CPC ............ *H01M 4/5815* (2013.01); *C01G 23/002* (2013.01); *C01G 23/003* (2013.01); *H01M 4/485* (2013.01); *C01P 2002/72* (2013.01); *C01P 2006/40* (2013.01); *H01M 4/136* (2013.01); *H01M 10/052* (2013.01); *H01M 10/0562* (2013.01); *Y02E 60/122* (2013.01)

(58) Field of Classification Search
CPC ... H01M 4/485; H01M 4/5815; H01M 4/136; H01M 10/052; H01M 10/0562
See application file for complete search history.

(56) References Cited

U.S. PATENT DOCUMENTS

| 5,567,539 A * | 10/1996 | Takahashi | ............ H01H 37/323 429/57 |
|---|---|---|---|
| 2011/0183221 A1* | 7/2011 | Serra Alfaro | ....... H01M 4/8605 429/416 |
| 2012/0026780 A1* | 2/2012 | Schloss | .............. G11C 11/5685 365/148 |
| 2012/0321981 A1* | 12/2012 | Liu | ..................... H01M 8/2425 429/465 |
| 2013/0022875 A1 | 1/2013 | Tojigamori et al. | |

FOREIGN PATENT DOCUMENTS

| CN | 102812584 A | 12/2012 | |
| WO | WO-2011/117992 A1 * | 9/2011 | ............ H01M 4/485 |
| WO | WO 2011/118302 A1 | 9/2011 | |

OTHER PUBLICATIONS

Derwent Abstract of WO 2011/117992, Oki, Sep. 29, 2011.*
Hyett et al., "Electronically Driven Structural Distortions in Lithium Intercalates of the $n=2$ Ruddlesden-Popper-Type Host $Y_2Ti_2O_5S_2$: Synthesis, Structure, and Properties of $Li_xY_2Ti_2O_5S_2$ ($0 < x < 2$)." J.Am.Soc., Jan. 31, 2004, pp. 1980-1991, vol. 126(7).

* cited by examiner

*Primary Examiner* — Kenneth Douyette
(74) *Attorney, Agent, or Firm* — Oliff PLC

(57) ABSTRACT

A battery active material includes a crystal phase that is represented by a formula $Y_{2-x}Sc_xTi_2O_5S_2$ (where $0<x<2$), and has a Ruddlesden-Popper structure.

11 Claims, 4 Drawing Sheets

US 9,397,336 B2

BATTERY ACTIVE MATERIAL COMPRISING A CRYSTAL PHASE HAVING A RUDDLESDEN-POPPER STRUCTURE AND BATTERY INCLUDING THE SAME

INCORPORATION BY REFERENCE

The disclosure of Japanese Patent Application No. 2012-275393 filed on Dec. 18, 2012 including the specification, drawings and abstract is incorporated herein by reference in its entirety.

BACKGROUND OF THE INVENTION

1. Field of the Invention

This invention relates to a battery active material which is useful as, for example, a negative electrode active material in a lithium battery. The invention further relates to a battery using the active material.

2. Description of Related Art

Lithium batteries, owing to their high electromotive force and high energy density, are widely used in information-related devices and communications devices. In the automotive field as well, electric vehicles and hybrid vehicles are being rapidly developed in order to address environmental problems and resource issues, and lithium batteries are under investigation as power supplies for such vehicles. Lithium batteries generally have a positive electrode active material layer containing a positive electrode active material, a negative electrode active material layer containing a negative electrode active material, and an electrolyte layer formed between the positive electrode active material layer and the negative electrode active material layer.

Carbon materials (e.g., graphite) have been used as the negative electrode active material in lithium batteries. On the other hand, active materials having a high thermal stability are desired to further improve battery safety. In this connection, International Patent Application Publication No. 2011/118302 (WO 2011/118302) describes, as a battery active material having a high thermal stability, a battery active material which includes an element M that is a Group III element, the elements titanium (Ti), oxygen (O) and sulfur (S), and contains a $M_2Ti_2O_5S_2$ crystal phase.

To achieve a high battery performance, there exists a desire for a high-capacity battery active material.

SUMMARY OF THE INVENTION

The invention provides a high-capacity battery active material.

According to an aspect of the invention, a battery active material includes a crystal phase that is represented by a formula $Y_{2-x}Sc_xTi_2O_5S_2$ (where $0<x<2$), and has a Ruddlesden-Popper structure.

According to the above-described aspect of the invention, by substituting a part of yttrium (Y) in the $Y_2Ti_2O_5S_2$ crystal phase having the Ruddlesden-Popper structure with scandium (Sc), the high-capacity battery active material can be obtained.

In the above-described aspect, x may satisfy a relationship $0<x\leq0.4$.

The battery active material may be a negative electrode active material.

According to another aspect of the invention, a battery includes a positive electrode active material layer that contains a positive electrode active material; a negative electrode active material layer that contains a negative electrode active material; and an electrolyte layer formed between the positive electrode active material layer and the negative electrode active material layer, wherein the positive electrode active material or the negative electrode active material is the above-described battery active material.

According to the above-described aspect, by using the above-described battery active material, the high-capacity battery can be obtained.

In the above-described aspects of the invention, it is possible to obtain the high-capacity battery active material.

BRIEF DESCRIPTION OF THE DRAWINGS

Features, advantages, and the technical and industrial significance of exemplary embodiments of the invention will be described below with reference to the accompanying drawings, in which like numerals denote like elements, and wherein.

DETAILED DESCRIPTION OF EMBODIMENTS

Figure 1:
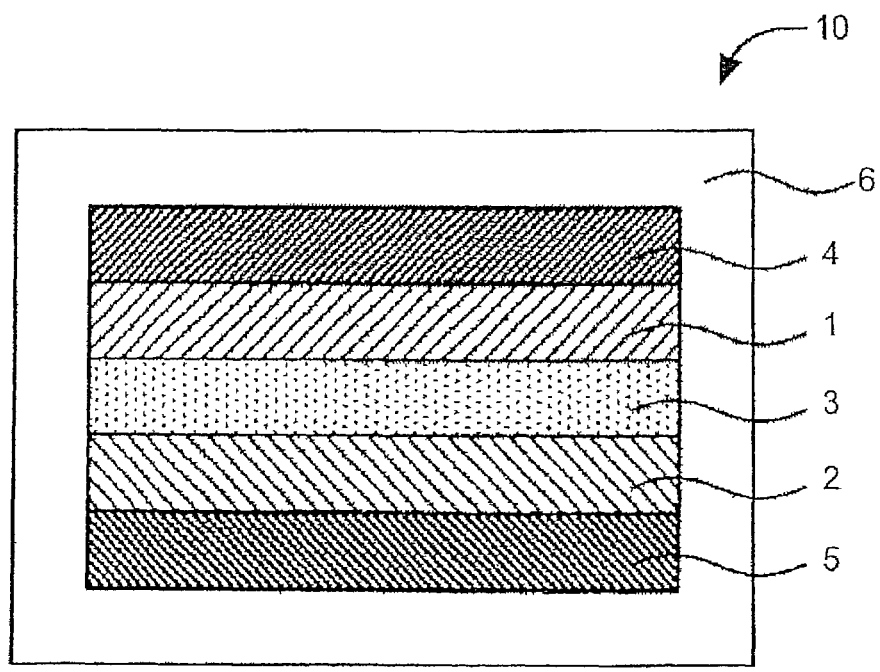
FIG. 1 shows a schematic sectional view of an example of a battery according to the invention.

A battery active material and a battery according to the invention will be described in detail below.

A. Battery Active Material First, the battery active material according to the invention will be described. The battery active material according to the invention includes a crystal phase that is represented by the formula $Y_{2-x}Sc_xTi_2O_5S_2$ (where $0<x<2$), and has a Ruddlesden-Popper structure.

According to the invention, by substituting a part of yttrium (Y) in the $Y_2Ti_2O_5S_2$ crystal phase having the Ruddlesden-Popper structure with scandium (Sc), a high-capacity battery active material can be obtained. Because the battery active material according to the invention has a low potential, it is useful as, for example, a negative electrode active material. Moreover, because the battery active material according to the invention includes the element oxygen and exhibits the behavior of an oxide, the battery active material according to the invention has the advantage of excellent thermal stability.

WO 2011/118302 describes a battery active material containing a $M_2Ti_2O_5S_2$ crystal phase (where M is a Group III element). In addition, WO 2011/118302 describes a $Y_2Ti_2O_5S_2$ crystal phase in an example. However, because yttrium has a very large atomic weight, the formula weight of the battery active Material becomes large. As a result, the theoretical capacity per unit weight is low. In this invention, the theoretical capacity per unit weight can be increased by substituting a part of yttrium in the $Y_2Ti_2O_5S_2$ crystal phase with scandium, which has a lower atomic weight than yttrium and thus is lighter than yttrium. Also, as will be mentioned in the subsequently described reference examples, the inventors have obtained a new finding, in other words, the inventors have found that there is a fixed correlation between the ionic radius of ions that enter the M sites and the potential of the active material. Specifically, they have found that as the ionic radius of the ions that enter the M sites decreases, the potential of the battery active material tends to decrease. As a result, by substituting a part of yttrium in the $Y_2Ti_2O_5S_2$ crystal phase with scandium, which has a smaller ionic radius than yttrium, a lower potential is achieved. It was possible to actually confirm this in the examples of the invention. The reason why a lower potential was actually achieved is thought to be that the crystal structure was changed by adding scandium.

The battery active material according to the invention includes a $Y_{2-x}Sc_xTi_2O_5S_2$ crystal phase having the Ruddlesden-Popper structure. In the specification, this crystal phase may be referred to simply as the $Y_{2-x}Sc_xTi_2O_5S_2$ crystal phase. The presence of the $Y_{2-x}Sc_xTi_2O_5S_2$ crystal phase can be confirmed by X-ray diffraction (XRD) analysis. Also, the $Y_{2-x}Sc_xTi_2O_5S_2$ crystal phase is thought to correspond to a crystal phase having a defective Ruddlesden-Popper structure. Generally, a Ruddlesden-Popper structure has a composition represented by the general formula $A_{n+1}B_nC_{3n+1}$ (where n is an integer), and has a layered structure in which layers having a perovskite structure and layers having a rock salt structure are alternately provided. Here, when n=2, the above general formula can be represented as $A_3B_2C_7$. When this $A_3B_2C_7$ is compared with the $Y_{2-x}Sc_xTi_2O_5S_2$ in the invention, (Y+Sc) is positioned at A sites, titanium (Ti) is positioned at B sites, and oxygen (O) and sulfur (S) are positioned at C sites. Moreover, when three atoms of (Y+Sc) are positioned at A sites, this corresponds to a perfect Ruddlesden-Popper structure, but only two atoms of (Y+Sc) are positioned at A sites in this invention. As a result, it is thought that a defect occurs at this A site, a metal ion (e.g., a lithium ion) is inserted/extracted at the defect site, and the function of an active material is clearly manifested. Moreover, it is thought that the reaction between the $Y_{2-x}Sc_xTi_2O_5S_2$ crystal phase and metal ions (e.g., lithium ions) takes place as follows, and the $Y_{2-x}Sc_xTi_2O_5S_2$ crystal phase functions as an insertion/extraction type active material.

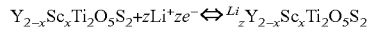

Yttrium and scandium in the $Y_{2-x}Sc_xTi_2O_5S_2$ crystal phase are generally trivalent.

The value of x in the $Y_{2-x}Sc_xTi_2O_5S_2$ crystal phase is not particularly limited, as long as it is larger than 0 and less than 2. The value of x is preferably equal to or larger than 0.05, and more preferably equal to or larger than 0.1. The value of x is preferably equal to or less than 1, more preferably equal to or less than 0.5, and even more preferably equal to or less than 0.4.

It is preferable that the battery active material according to the invention should have a high proportion of $Y_{2-x}Sc_xTi_2O_5S_2$ crystal phase and, more specifically, should contain mainly the $Y_{2-x}Sc_xTi_2O_5S_2$ crystal phase. In this case, the battery active material having a higher capacity can be provided. The phrase "contain mainly the $Y_{2-x}Sc_xTi_2O_5S_2$ crystal phase" means that the $Y_{2-x}Sc_xTi_2O_5S_2$ crystal phase accounts for the highest proportion of the crystal phase included in the battery active material. The proportion of the $Y_{2-x}Sc_xTi_2O_5S_2$ crystal phase included in the battery active material is preferably equal to or larger than 50 mol %, more preferably equal to or larger than 60 mol %, and even more preferably equal to or larger than 70 mol %. The battery active material according to the invention may be composed of only the $Y_{2-x}Sc_xTi_2O_5S_2$ crystal phase (single-phase active material). The proportion of the $Y_{2-x}Sc_xTi_2O_5S_2$ crystal phase included in the battery active material can be determined by, for example, producing a battery in which metal lithium serves as the counterelectrode, and measuring its capacity.

Alternatively, the proportion of the $Y_{2-x}Sc_xTi_2O_5S_2$ crystal phase included in the battery active material may be calculated by Rietveld analysis.

The battery active material according to the invention has a lithium insertion/extraction potential with respect to metal lithium which is preferably 1.5 V or less, more preferably 1.4 V or less, even more preferably 1.3 V or less, and most preferably 1.2 V or less. The reason is that, when the battery active material according to the invention is used as the negative electrode active material of a lithium battery, the battery voltage can be made the same as or higher than when conventional lithium titanium oxide (LTO, the lithium insertion/extraction potential is 1.5 V) is used as the negative electrode active material. Also, the battery active material according to the invention has a lithium insertion/extraction potential with respect to metal lithium which is preferably equal to or higher than 0.5 V. In this invention, the lithium insertion/extraction potential of the battery active material can be defined as the average value of the lithium insertion potential and the lithium extraction potential. The lithium insertion potential and the lithium extraction potential can be determined by cyclic voltammetry (CV).

The battery active material according to the invention may be used as a positive electrode active material or may be used as a negative electrode active material. The battery active material according to the invention is preferably used as the negative electrode active material. The reason is that when the battery active material according to the invention is used as the negative electrode active material in a lithium battery, for example, the battery voltage can be made larger than when a conventional LTO is used as the negative electrode active material.

As the proportion of the $Y_{2-x}Sc_xTi_2O_5S_2$ crystal phase in the battery active material according to the invention becomes higher, the electron conductivity tends to increase. If the electron conductivity of the active material itself is high, the amount of conductive material used can be reduced, and accordingly, the amount of active material used can be increased. As a result, this has the advantage that a higher battery capacity can be achieved. The electron conductivity (room temperature) of the battery active material according to the invention is preferably at least 1e S/cm, and more preferably at least $10^{-5}$ S/cm.

The battery active material according to the invention is preferably in the form of particles. The average particle size of the battery active material is, for example, in the range of 1 nm to 100 µm, and preferably in the range of 10 nm to 30 µm.

Because metal (metal ions) can be inserted/extracted in/from the battery active material according to the invention, it can be used as the active material in various types of batteries. Examples of such batteries include lithium batteries, sodium batteries, magnesium batteries and calcium batteries. Among these, lithium batteries and sodium batteries are preferable, and lithium batteries are especially preferable. Also, the battery active material according to the invention may be an active material used in primary batteries or may be an active material used in secondary batteries. The battery active material according to the invention is preferably an active material used in secondary batteries, because it can be repeatedly charged and discharged, and is useful as an active material used in, for example, in-vehicle batteries.

The method of producing the battery active material according to the invention is not particularly limited, as long as the above-described battery active material by the method. One example of a method of producing the battery active material according to the invention is a solid phase process. A specific example of a solid phase process is a method in which $Y_2O_3$, $Sc_2O_3$, $TiO_2$ and $TiS_2$ are mixed in a proportion which allows a $Y_{2-x}Sc_xTi_2O_5S_7$ crystal phase to be obtained, and heated. To suppress unnecessary side-reactions, it is preferable to carry out heating in a vacuum state. For example, by mixing equimolar amounts of ($Y_2O_3$+$Sc_2O_3$), $TiO_2$ and $TiS_2$, it is stoichiometrically possible to obtain the composition $Y_{2-x}Sc_xTi_2O_5S_2$. Also, because $Sc_2O_3$ is highly hygroscopic, it is preferable that $Sc_2O_3$ alone or a $Sc_2O_3$-containing mixture should be dried prior to firing. Other methods that may be used to produce the battery active material according to the invention include a method in which a mixture of materials is amorphized by mechanical milling and subsequently firing is carried out, and a chemical vapor deposition (CVD) method. Also, because the battery active material according to the invention includes the element sulfur (S), deterioration due to reaction of the sulfur with moisture in the atmosphere is conceivable. Therefore, storage of the battery active material and battery production using the battery active material are preferably carried out in an inert gas atmosphere.

B. Battery Next, the battery according to the invention will be described. The battery according to the invention is a battery including a positive electrode active material layer that contains a positive electrode active material, a negative electrode active material layer that contains a negative electrode active material, and an electrolyte layer formed between the positive electrode active material layer and the negative electrode active material layer. In this battery according to the invention, the positive electrode active material or the negative electrode active material is the above-described battery active material.

FIG. 1 is a schematic sectional view showing an example of the battery according to the invention. The battery 10 shown in FIG. 1 is a positive electrode active material layer 1, a negative electrode active material layer 2, an electrolyte layer 3 formed between the positive electrode active material layer 1 and the negative electrode active material layer 2, a positive electrode current collector 4 which collects current from the positive electrode active material layer 1, a negative electrode current collector 5 which collects current from the negative electrode active material layer 2, and a battery case 6 which houses these components. In the battery according to the invention, the positive electrode active material layer 1 or the negative electrode active material layer 2 includes the battery active material described above under "A. Battery Active Material."

According to this invention, by using the battery active material described above, there can be obtained a high-capacity battery. Moreover, it is possible to obtain a battery having a large battery voltage, particularly in the case where the negative electrode active material layer includes the above-described battery active material. Each element of the battery according to the invention will be explained below.

1. Negative Electrode Active Material Layer First, the negative electrode active material layer in this invention will be described. The negative electrode active material layer in the invention is a layer containing at least a negative electrode active material. In addition to a negative electrode active material, the negative electrode active material layer may include at least one of a conductive material, a binder and a solid electrolyte material. Particularly in the case where the battery according to the invention is a solid battery having a solid electrolyte layer, it is preferable that the negative electrode active material layer should include a solid electrolyte material, for the following reason. A solid electrolyte layer less readily penetrates to the interior of the negative electrode active material layer, as compared with a liquid electrolyte layer (electrolyte solution). Therefore, there is a possibility that ionic conductivity at the interior of the negative electrode active material layer may be low. By adding a solid electrolyte material, the ionic conductivity of the negative electrode active material layer can easily be increased.

In this invention, the negative electrode active material is preferably the battery active material described above under "A. Battery Active Material." The reason is that when the battery according to the invention is, for example, a lithium battery, the battery voltage can be increased, as compared with a battery in which a conventional LTO is used as the negative electrode active material. In this invention, it is also possible to use the above-described battery active material as the positive electrode active material and to use a conventional active material as the negative electrode active material. In such a case, an active material having a lower potential than the above-described battery active material needs to be used as the negative electrode active material. In addition, because the above-described battery active material does not include a metal element capable of becoming conductive ions (for example, element lithium), it is preferable that the negative electrode active material should include such a metal element. Particularly in the case where the battery according to the invention is a lithium battery and the above-described battery active material is included as the positive electrode active material, it is preferable to use a lithium-containing active material such as metal lithium or lithium alloy as the negative electrode active material in the battery.

The conductive material is not particularly limited, as long as the conductive material has the desired electron conductivity. For example, a carbon material may be used. Specific examples of carbon materials include acetylene black, ketjen black, carbon black, coke, carbon fibers and graphite. The binder is not particularly limited, as long as the binder is chemically and electrically stable. Specific examples include fluorine-containing binders such as polyvinylidene fluoride (PVDF) and polytetrafluoroethylene (PTFE), and rubber-based binders such as styrene-butadiene rubber. The solid electrolyte material is not particularly limited, as long as the solid electrolyte material has the desired ionic conductivity. Specific examples include solid oxide electrolyte materials and solid sulfide electrolyte materials. The solid electrolyte material will be subsequently described in detail under "3. Electrolyte Layer."

From the standpoint of capacity, it is preferable that the content of the negative electrode active material in the negative electrode active material layer should be higher. The content of the negative electrode active material in the negative electrode active material layer is preferably, for example, in the range of 60 to 99 wt %, and more preferably in the range of 70 to 95 wt %. It is preferable that the content of the conductive material should be lower, as long as the desired electron conductivity can be ensured. The content of the conductive material is preferably, for example, in the range of 1 to 30 wt %. It is preferable that the content of binder should be lower, as long as the negative electrode active material can be stably immobilized. The content of binder is preferably, for example, in the range of 1 to 30 wt %. It is preferable that the content of the solid electrolyte material should be lower, as long as the desired ionic conductivity can be ensured. The content of the solid electrolyte material is preferably, for example, in the range of 1 to 40 wt %.

The thickness of the negative electrode active material may differ greatly depending on the battery configuration, but is preferably in the range of 0.1 μm to 1,000 μm.

2. Positive Electrode Active Material Layer Next, the positive electrode active material layer in the invention will be described. The positive electrode active material layer in this invention is a layer which contains at least a positive electrode active material. In addition to the positive electrode active material, the positive electrode active material layer may include at least one of a conductive material, a binder and a solid electrolyte material. Particularly in the case where the battery according to the invention is a solid battery having a solid electrolyte layer, it is preferable that the positive electrode active material layer should include a solid electrolyte material for the following reason. A solid electrolyte layer less readily penetrates to the interior of the positive electrode active material layer, as compared with a liquid electrolyte layer (electrolyte solution). Thus, there is a possibility that the ionic conductivity at the interior of the positive electrode active material layer may be low. By adding a solid electrolyte material, the ionic conductivity of the positive electrode active material layer can easily be increased.

In this invention, the positive electrode active material is preferably an active material having a higher potential than the above-described battery active material. That is, the above-described battery active material is preferably used as the negative electrode active material rather than the positive electrode active material. The reason is that, in the case where the battery according to the invention is a lithium battery, for example, the battery voltage can be made larger than in batteries in which a conventional LTO is used as the negative electrode active material.

When the above-described battery active material is used as the negative electrode active material, an ordinary active material may be used as the positive electrode active material. In the case where the battery according to the invention is a lithium battery, examples of the positive electrode active material include layered positive electrode active materials such as $LiCoO_2$, $LiNiO_2$, $LiCo_{1/3}Ni_{1/3}Mn_{1/3}O_2$, $LiNi_{0.5}Mn_{0.5}O_2$, $LiVO_2$ and $LiCrO_2$; spinel-type positive electrode active materials such as $LiMn_2O_4$, $Li(Ni_{0.25}Mn_{0.75})_2O_4$ and $LiCoMnO_4$; and olivine-type positive electrode active materials such as $LiCoPO_4$, $LiMnPO_4$ and $LiFePO_4$.

The positive electrode active material in this invention is preferably an active material having a lithium insertion/extraction potential with respect to metal lithium which is equal to or higher than 4.5 V, and more preferably an active material having a lithium insertion/extraction potential in the range of 4.6 to 4.8 V. This is because the use of such a positive electrode active material in combination with the above-described battery active material (negative electrode active material) enables a battery having a voltage of 3.4 to 3.7 V to be easily obtained. The reason why this battery voltage is preferable will be explained later in the specification. The lithium insertion/extraction potential of the positive electrode active material with respect to metal lithium can be calculated by the same method as was described above under "A. Battery Active Material,"

The positive electrode active material in this invention is preferably an active material which includes at least the element lithium (Li), the element manganese (Mn) and the element oxygen (O) (i.e., a manganese-containing active material). In this case, it is preferable to further include at least one element selected from the group consisting of nickel (Ni), chromium (Cr), iron (Fe), copper (Cu) and cobalt (Co), more preferable to further include at least one element selected from the group consisting of nickel, chromium, iron and copper, and especially preferable to further include nickel. Also, the above positive electrode active material is preferably a spinel-type active material, because it is possible to obtain a positive electrode active material having a high lithium insertion/extraction potential with respect to metal lithium. Specific examples of such positive electrode active materials include $LiMn_2O_4$ (4.0 V), $Li(Ni_{0.25}Mn_{0.75})_2O_4$ (4.7 V), $LiCoMnO_4$ (5.0 V), $Li_2FeMn_3O_8$ (4.9 V), $Li_2CuMn_3O_8$ (4.9 V) and $Li_2CrMn_3O_8$ (4.8 V). The above potentials indicate the lithium insertion/extraction potentials with respect to metal lithium.

Also, in the invention, the difference between the lithium insertion/extraction potential of the positive electrode active material with respect to metal lithium and the lithium insertion/extraction potential of the negative electrode active material with respect to metal lithium is preferably in the range of 3.4 to 3.7 V, and more preferably in the range of 3.5 to 3.7 V. Within this range, the battery according to the invention can be employed in devices currently in wide use (devices equipped with batteries having a battery voltage of 3.6 V) without the need of making design changes.

The battery voltage can be defined by the difference between the lithium insertion/extraction potentials of the positive electrode active material and the negative electrode active material. When metal lithium is used as the basis, the lithium insertion/extraction potential of a conventional $LiCoO_2$ (positive electrode active material) is about 3.9 V, the lithium insertion/extraction potential of conventional carbon materials (negative electrode active materials) is about 0.3 V, and the difference of about 3.6 V between the two is the battery voltage of conventional lithium batteries. Because $LiCoO_2$ is widely used in ordinary lithium batteries, portable devices such as cell phones, game modules and notebook computers are often designed under the assumption that the batteries will be used at around 3.6 V. At the same time, since the cobalt included in $LiCoO_2$ is a scarce metal, in order to reduce the amount of cobalt used, substitution with a manganese-based active material needs to be investigated.

However, when a manganese-containing active material is used instead of the currently widely used $LiCoO_2$, there is the problem that, even if a conventional carbon material or LTO is used as the negative electrode active material, the battery voltage will not be close to 3.6 V, and as a result, the design of devices which use such batteries will have to be changed. On the other hand, by using the above-described battery active material (e.g., an active material having a lithium insertion/extraction potential of 1.1 to 1.2 V) as the negative electrode active material, and using the above-described manganese-containing active material (e.g., an active material having a lithium insertion/extraction potential of 4.6 to 4.8 V) as the positive electrode active material, it is possible to easily obtain a battery having a battery voltage of 3.4 to 3.7 V. This approach has the advantage that the design of conventional devices need not be changed. Moreover, by using a manganese-containing active material as the positive electrode active material, the amount of the scarce metal cobalt used can be reduced.

The positive electrode active material is preferably in the form of particles. The average particle size of the positive electrode active material is preferably, for example, in the range of 1 nm to 100 μm, and more preferably in the range of 10 nm to 30 μm. From the standpoint of capacity, it is preferable that the content of the positive electrode active material in the positive electrode active material layer should be larger. The content of the positive electrode active material in the positive electrode active material layer is preferably, for example, in the range of 60 to 99 wt %, and more preferably in the range of 70 to 95 wt %. The types and contents of the conductive materials, binders and solid electrolyte materials which may be used in the positive electrode active material layer are the same as those for the negative electrode active material layer described above, and thus are not mentioned here. The thickness of the positive electrode active material layer differs considerably depending on the configuration of the battery, but is preferably in the range of 0.1 μm to 1,000 μm.

3. Electrolyte Layer Next, the electrolyte layer in the invention will be described The electrolyte layer in the invention is a layer formed between the above positive electrode active material layer and the above negative electrode active material layer. Ion conduction is carried out between the positive electrode active material and the negative electrode active material via the electrolyte included in the electrolyte layer. The form of the electrolyte layer is not particularly limited. Specific examples include a liquid electrolyte layer, a gel electrolyte layer and a solid electrolyte layer.

A liquid electrolyte layer is a layer which is generally formed using a nonaqueous electrolyte solution. The type of nonaqueous electrolyte solution differs according to the type of battery. For example, the nonaqueous electrolyte solution of a lithium battery typically includes a lithium salt and a nonaqueous solvent. Specific examples of lithium salts include inorganic lithium salts such as $LiPF_6$, $LiBF_4$, $LiClO_4$ and $LiAsF_6$; and organic lithium salts such as $LiCF_3SO_3$, $LiN(CF_3SO_2)_2$, $LiN(C_2F_5SO_2)_2$ and $LiC(CF_3SO_2)_3$. Specific examples of nonaqueous solvents include ethylene carbonate (EC), propylene carbonate (PC), dimethyl carbonate (DMC), diethyl carbonate (DEC), ethyl methyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyltetrahydrofuran and mixtures thereof. The concentration of lithium salt in the nonaqueous electrolyte solution is, for example, in the range of 0.5 to 3 mol/L. Also, in this invention, a low-volatility liquid such as an ionic liquid may be used as the nonaqueous electrolyte solution.

A gel electrolyte layer can be obtained by, for example, adding a polymer to a nonaqueous electrolyte solution so that a gel is generated. Specifically, the gel can be generated by adding a polymer such as polyethylene oxide (PEO), polyacrylonitrile (PAN) or polymethyl methacrylate (PMMA) to a nonaqueous electrolyte solution.

The solid electrolyte layer is a layer formed using a solid electrolyte material. Specific examples of solid electrolyte materials include solid oxide electrolyte materials and solid sulfide electrolyte materials. For example, in the case where the battery according to the invention is a lithium battery, the solid electrolyte material is preferably a solid sulfide electrolyte material, because the lithium ion conductivity is high, and it is possible to obtain a high-power battery. Specific examples of solid sulfide electrolyte materials having lithium ion conductivity include those containing lithium (Li), sulfur (S) and a third ingredient A. Examples of the third ingredient A include at least one selected from the group consisting of phosphorus (P), germanium (Ge), boron (B), silicon (Si), iodine (I), aluminum (Al), gallium (Ga) and arsenic (As). In the invention, the solid sulfide electrolyte material is preferably a compound which uses $Li_2S$ and a sulfide MS other than $Li_2S$. Specific examples include a $Li_2S$—$P_2S_5$ compound, a $Li_2S$—$SiS_2$ compound and a $Li_2S$—$GeS_2$ compound. Among these, a $Li_2S$—$P_2S_5$ compound is preferable because the lithium ion conductivity is high. In addition, when the molar ratio of $Li_2S$ and the sulfide MS is $xLi_2S$-$(100-x)MS$, it is preferable that x should satisfy the relationship 50≤x≤95, and it is more preferable that x should satisfy the relationship 60≤x≤85. "$Li_2S$—$P_2S_5$ compound" refers to a solid sulfide electrolyte material which uses $Li_2S$ and $P_2S_5$. The same applies to the other compounds. For example, an amorphous $Li_2S$—$P_2S_s$ compound can be obtained from $Li_2S$ and $P_2S_5$ by using mechanical milling or a melting and quenching process.

The solid electrolyte material in this invention may be amorphous or may be crystalline. A crystalline solid sulfide electrolyte material can be obtained by firing an amorphous solid sulfide electrolyte material. For example, by firing an amorphous solid sulfide electrolyte material having the composition 70$Li_2S$-30$P_2S_5$, crystalline $Li_7P_3S_1$ having a high lithium ion conductivity can be obtained. The solid electrolyte material is preferably in the form of particles. The average particle size of the solid electrolyte material is preferably, for example, in the range of 1 nm to 100 μm, and more preferably in the range of 10 nm to 30 μm.

The thickness of the electrolyte layer differs greatly depending on the type of electrolyte and the configuration of the battery, but the thickness of the electrolyte layer is preferably, for example, in the range of 0.1 μm to 1,000 μm, and more preferably in the range of 0.1 μm to 300 μm.

4. Other Features The battery according to the invention includes at least the above-described negative electrode active material layer, positive electrode active material layer and electrolyte layer. In addition, the battery typically includes a positive electrode current collector that collects current from the positive electrode active material layer, and a negative electrode current collector that collects current from the negative electrode active material layer. Examples of the material forming the positive electrode current collector include stainless steel, aluminum, nickel, iron, titanium and carbon. Among these, stainless steel is preferable. Examples of the material forming the negative electrode current collector include stainless steel, copper, nickel and carbon. Among these, stainless steel is preferable. It is preferable to suitably select the thickness, shape and other characteristics of the positive electrode current collector and the negative electrode current collector according to, for example, the intended use of the battery.

The battery according to the invention may include a separator disposed between the positive electrode active material layer and the negative electrode active material layer, the purpose being to enable a battery having a higher safety to be obtained. The examples of the separator material include porous films made of polyethylene, polypropylene, cellulose and polyvinylidene fluoride; and nonwoven fabrics such as resin nonwoven fabrics and glass fiber nonwoven fabrics. The battery case used in the invention may be the battery case for an ordinary battery. An example of the battery case is a battery case made of stainless steel.

5. Battery The battery according to the invention is not particularly limited, as long as the battery includes the positive electrode active material layer, negative electrode active material layer and electrolyte layer as described above. Examples of the battery according to the invention include lithium batteries, sodium batteries, magnesium batteries and calcium batteries. Among these, lithium batteries and sodium batteries are preferable, and lithium batteries are especially preferable. The battery according to the invention may be a battery in which the electrolyte layer is a solid electrolyte layer, or may be a battery in which the electrolyte layer is a liquid electrolyte layer. In addition, the battery according to the invention may be a primary battery or a secondary battery. The battery according to the invention is preferably a secondary battery, because a secondary battery can be repeatedly charged and discharged, and is useful as, for example, an in-vehicle battery. The battery according to the invention has a shape which may be, for example, a coin shape, a laminate shape, a cylindrical shape or a prismatic shape. The method of producing the battery is not particularly limited, and is similar to a production method for an ordinary battery.

The invention is not limited to the above-described embodiments. It is to be understood that the above-described embodiments are illustrative, and all other embodiments having configurations which are substantially the same as the technical concepts set forth in the claims and exhibiting similar effects and advantages are encompassed by the technical scope of this invention.

The invention will be described more specifically in the following examples.

EXAMPLE 1

Figure 2A:
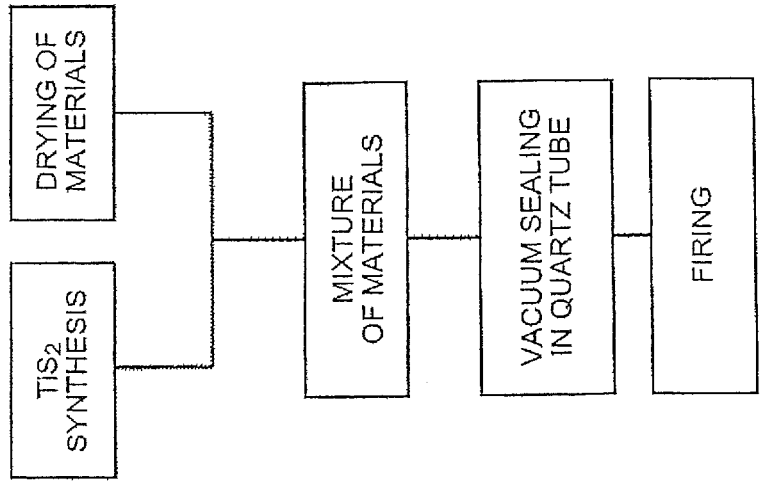
FIGS. 2A and 2B are flow charts showing a method of producing active materials in Examples 1 and 3.

A battery active material was produced according to the flow chart shown in FIG. 2A. Synthesis of $TiS_2$: Within an argon (Ar) glovebox, titanium and sulfur (both from Rare Metallic Co., Ltd) were weighed out to a molar ratio of 1:2 and mixed together in a mortar. The resulting mixture was filled into a pelletizer and pressed under 1,000 kg of pressure to produce pellets. The resulting pellets were placed in a quartz tube and vacuum-sealed (degree of vacuum, $10^{-5}$ Pa). Next, the temperature was raised from room temperature to 600° C. over a period of 36 hours, and firing was carried out at 600° C. for 96 hours, and thus, titanium sulfide ($TiS_2$) was obtained.

Mixing of Materials, Vacuum Drying, Vacuum Sealing and Firing: In addition to $TiS_2$, other materials provided for use were $Y_2O_3$, $Sc_2O_3$ and $TiO_2$. Within an argon glovebox, these materials were then weighed out to a molar ratio of Y:Sc:Ti:O:S=2−x:x:2:5:2 (where x=0.2) and mixed together in a mortar. The resulting mixture was filled into a pelletizer and pressed under 1,000 kg of pressure to produce pellets. The resulting pellets were vacuum-dried in a quartz tube at 120° C. and $10^{-5}$ Pa for 24 hours. The vacuum-dried pellets were vacuum-sealed in a quartz tube without letting them come into contact with the atmosphere. Next, the temperature was raised from room temperature to 1,100° C. over a period of 24 hours, and firing was carried out at 1,100° C. for 96 hours. Thus, a battery active material (sintered body; thickness, 0.5 mm) represented by the formula $Y_{2-x}Sc_xTi_2O_5S_2$ (where x=0.2) was obtained.

EXAMPLE 2

A battery active material was obtained in the same way as in Example 1, except that the composition of the materials was changed so that x=0.4.

COMPARATIVE EXAMPLES 1 TO 6

Battery active materials were obtained in the same way as in Example 1, except that the composition of the materials was changed so that x=0, x=0.8, x=1.0, x=1.2, x=1.6 and x=2.0, respectively.

Evaluation 1

Figure 3:
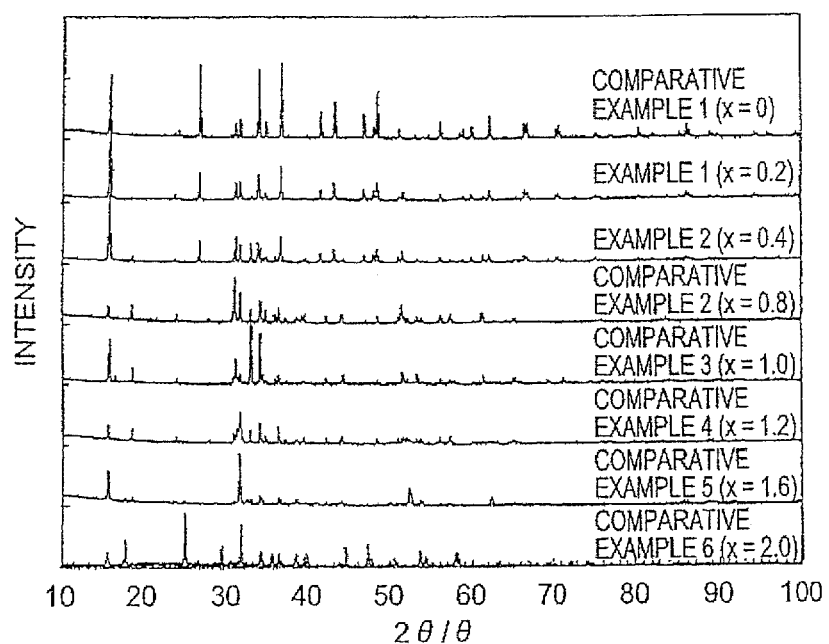
FIG. 3 shows the results of X-ray diffraction (XRD) measurement on active materials obtained in Examples 1 and 2 and Comparative Examples 1 to 6.

(1) X-Ray Diffraction (XRD) Measurement: XRD measurement was carried out using the active materials obtained in Examples 1 and 2 and in Comparative Examples 1 to 6. Measurement was carried out using the CuKα line and under the following conditions: measurement range, 10° to 80°; measurement step, 0.02°; scanning rate, 10°/min. The results are shown in FIG. 3. From the chart shown in FIG. 3, the active material obtained in Comparative Example 1 was confirmed to include a crystal phase having a Ruddlesden-Popper structure ($Y_2Ti_2O_5S_2$ crystal phase), Peaks indicating the $Y_2Ti_2O_5S_2$ crystal phase appeared at 2θ=15.6°, 26.2°, 31.3°, 33.6°, 36.4°, 41.3°, 43.0° and 48.2°. Also, because the active materials in Examples 1 and 2 had peaks at substantially the same positions as in the case of the active material in Comparative Example 1, the active materials in Examples 1 and 2 were confirmed to contain a $Y_{2-x}Sc_xTi_2O_5S_2$ crystal phase. Each of the peaks of the $Y_{2-x}Sc_xTi_2O_5S_2$ crystal phase was confirmed to be at a position within a range of ±0.5° with respect to the corresponding peak of the $Y_2Ti_2O_5S_2$ crystal phase. However, in Comparative Examples 2 to 6, the peak near 26.2° that is characteristic of the Ruddlesden-Popper structure was not found. This suggests the possibility that another crystal structure such as a pyrochlore structure was formed in the above synthesis method.

(2) Charge/Discharge Characteristics (First Test Battery); Test batteries were produced using the active materials obtained in Examples 1 and 2 and Comparative Examples 1 to 3 (sintered bodies; thickness, 0.5 mm) as the positive electrode active materials, and the charge/discharge characteristics of the resulting active materials were evaluated. A solution prepared by dissolving $LiPF_6$ to a concentration of 1 mol/L in a mixed solvent composed of EC, DMC and EMC in the volume ratio EC:DMC:EMC=3:4:3 was used as the electrolyte solution, and metal lithium was furnished as the negative electrode active material. Test batteries (2032-type coin cells) were produced using these components.

Figure 4A:
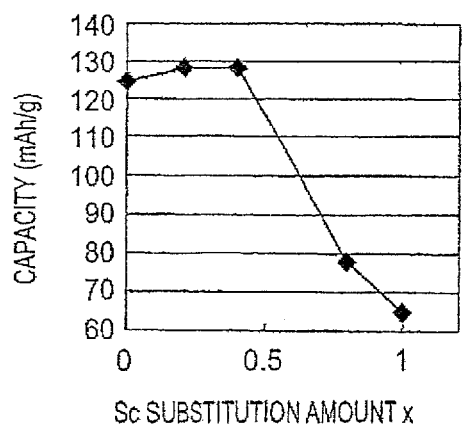
FIGS. 4A and 4B are graphs showing the results of evaluations on the charge-discharge characteristics of test batteries which use the active materials obtained in Examples 1 and 2 and Comparative Examples 1 to 3, and the results of XRD measurement on the active materials obtained in Examples 1 and 2 and Comparative Examples 1 to 6.
Figure 4B:
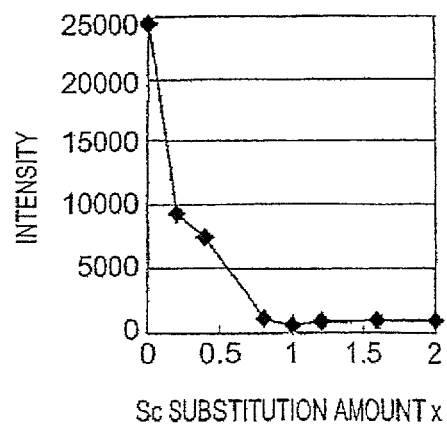

Next, charging and discharging of the resulting test batteries were carried out at a rate of 1/10 C and a cutoff voltage of 0.05 to 3.0 V. The discharge capacity results obtained are shown in FIG. 4A. As shown in FIG. 4A, in Example 1 (i=0.2) and Example 2 (x=0.4), higher capacities were obtained than in Comparative Example 1 (x=j). On the other hand, in Comparative Example 2 (x=0.8) and Comparative Example 3 (x=1.0), the capacities were low. FIG. 4B is a graph showing the intensity near 26.2°, which is characteristic of the Ruddlesden-Popper structure, as derived from FIG. 3. In the case where a peak exists, this intensity corresponds to the peak intensity, and in the case where such a peak does not exist, this is the intensity at 26.2°. In Comparative Examples 2 to 6, the peak near 26.2° vanished and the intensity at 26.2° was low intensity similar to that of noise. The results in FIGS. 4A and 4B suggest that the Ruddlesden-Popper structure contributes significantly to increasing the capacity.

Figure 5:
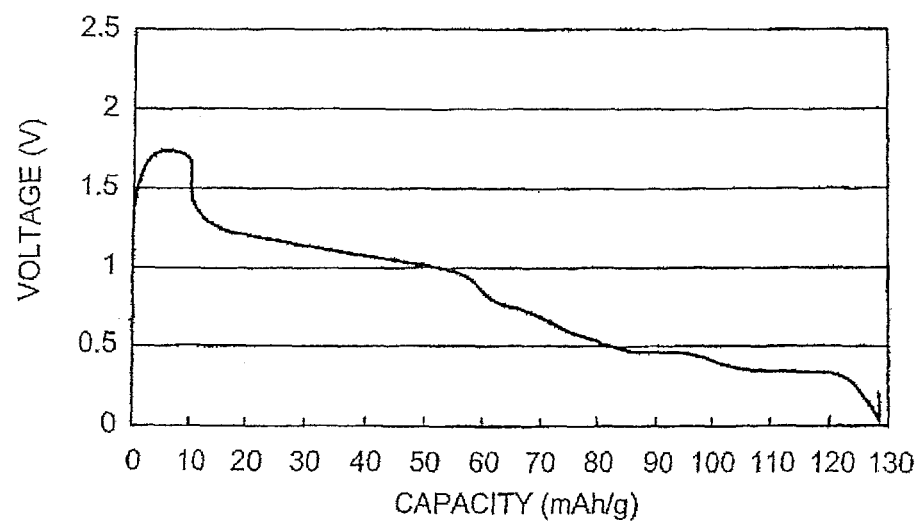
FIG. 5 is a graph showing the result of an evaluation on the charge-discharge characteristics of a test battery which uses the active material obtained in Example 1.
Figure 6:
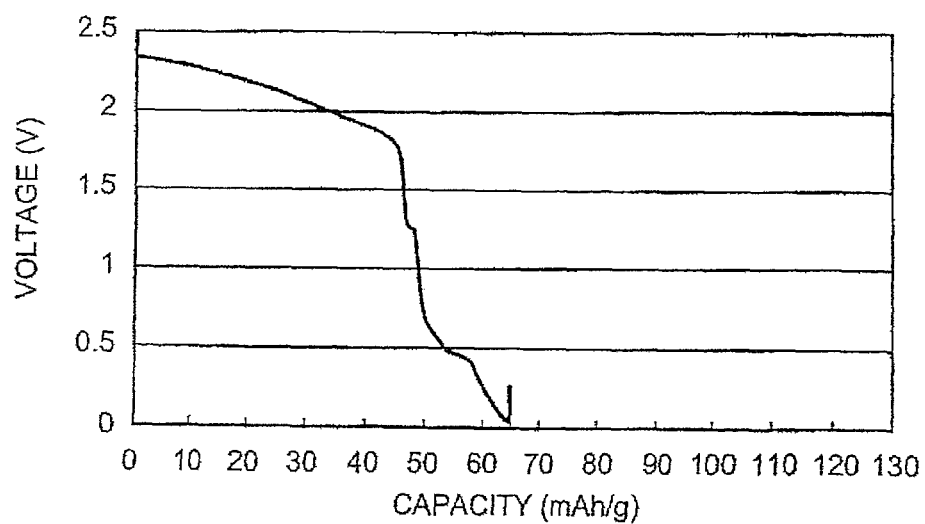
FIG. 6 is a graph showing the result of an evaluation on the charge-discharge characteristics of a test battery which uses the active material obtained in Comparative Example 2.

Charge/discharge curves for Example 1 and Comparative Example 2 are shown in FIGS. 5 and 6. As shown in FIG. 5, in Example 1, a potential flat portion at 1.3 to 0.3 V, which is characteristic of the Ruddlesden-Popper structure, was found. By contrast, as shown in FIG. 6, in Comparative Example 2, substantially no potential flat potential at 1.3 to 0.3 V, which is characteristic of a Ruddlesden-Popper structure, was found.

The discharge potentials (lithium metal basis) at 60% lithium insertion ($Li_{1.2}Y_{2-x}Sc_xTi_2O_5S_2$) in the active materials obtained in Examples 1 and 2 and Comparative Example 1 were measured. Those results are shown in Table 1.

TABLE 1

|  | Discharge potential at 60% lithium insertion | Discharge voltage | Electromotive force when LCO was used at the positive electrode | Increase in electromotive force |
|---|---|---|---|---|
| Comparative Example 1 (x = 0) | 0.67 V | — | 3.05 V | — |
| Example 1 (x = 0.2) | 0.58 V | 0.09 V | 3.14 V | 3.0% |
| Example 2 (x = 0.4) | 0.49 V | 0.18 V | 3.23 V | 5.9% |

As shown in Table 1, it was confirmed that the potential in each of Examples 1 and 2 is lower than in Comparative Example 1. Hence, when the battery active material according to this invention is used as the negative electrode active material, a battery having a high electromotive force can be obtained. When LCO (LiCoO$_2$, 3.9 V) was used in the positive electrode active material, the above-indicated electromotive forces were obtained.

EXAMPLE 3

Figure 2B:
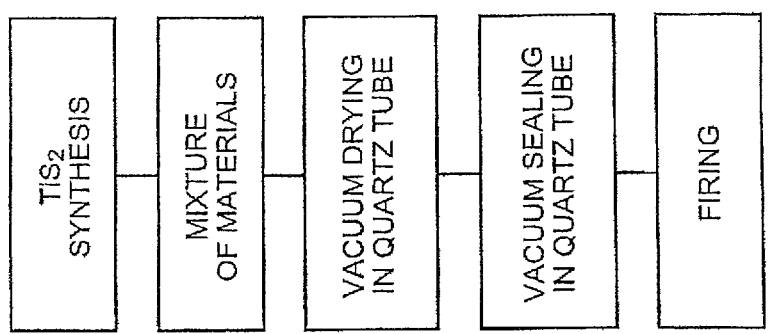

A battery active material was produced according to the flow chart shown in FIG. 2B. First, titanium sulfide (TiS$_2$) was obtained in the same way as in Example 1. Y$_2$O$_3$, Sc$_2$O$_3$ and TiO$_2$ were then furnished as the materials other than TiS$_2$. The Y$_2$O$_3$ was heated and dried for 24 hours in the atmosphere at 900° C., and stored within an argon (Ar) glovebox. The Sc$_2$O$_3$ was similarly heated and dried. The TiO$_2$ was heated and dried for 24 hours in the atmosphere at 600° C. and then stored in an argon glovebox. Next, these materials were weighed out within the argon glovebox to a molar ratio of Y:Sc:Ti:O:S=2−x:x:2:5:2 (where x=0.2), and mixed together in a mortar. The resulting mixture was filled into a pelletizer and pressed at 1,000 kg of pressure to produce pellets. The resulting pellets were placed in a quartz tube and vacuum-sealed (degree of vacuum, 10$^{-5}$ Pa). Next, the temperature was raised from room temperature to 1,100° C. over a period of 24 hours, and firing was carried out at 1,100° C. for 96 hours. Thus, a battery active material represented by the formula Y$_{2-x}$Sc$_x$Ti$_2$O$_5$S$_2$ (where x=0.2) was obtained. XRD measurement was carried out using the resulting battery active material.

As a result, this battery active material was confirmed to have peaks at the same positions as in Example 1. Thus, it was possible to confirm that the desired battery active material can be obtained by this method as well.

REFERENCE EXAMPLE

An active material represented by the formula M$_2$Ti$_2$O$_5$S$_2$ (where M=Y) was produced in Comparative Example 1. In this reference example, active materials in which other Group III elements are used as M were similarly synthesized. In addition, using the active materials thus obtained, test batteries were produced in the same way as in Example 1 and the discharge potential at 60% lithium insertion, was measured. The results are shown in Table 2.

TABLE 2

|  | Element | | | | | | | |
|---|---|---|---|---|---|---|---|---|
|  | Pr | Nd | Sm | Gd | Dy | Er | Y | Sc |
| Ionic radius | 1.13 | 1.12 | 1.10 | 1.08 | 1.05 | 1.03 | 1.04 | 0.89 |
| Discharge potential at 60% lithium insertion | 0.964 | 0.893 | 0.833 | 0.766 | 0.704 | 0.638 | 0.67 | — |

The results shown in Table 2 show that there is a fixed correlation between the ionic radius of the ions inserted at the M sites and the potential of the active material. Specifically, it was confirmed that the potential of the battery active material tends to decrease as the ionic radius of ions inserted at the M sites decreases. This tendency is consistent with the results in the above examples in which the potential was decreased by substituting a part of yttrium with scandium.

What is claimed is:

1. A battery active material comprising:
a crystal phase that is represented by a formula Y$_{2-x}$Sc$_x$Ti$_2$O$_5$S$_2$ (where 0<x<2), and has a Ruddlesden-Popper structure.

2. The battery active material according to claim 1, wherein x satisfies a relationship 0<x<0.4.

3. The battery active material according to claim 1, wherein the battery active material is a negative electrode active material.

4. A battery comprising:
a positive electrode active material layer that contains a positive electrode active material;
a negative electrode active material layer that contains a negative electrode active material; and
an electrolyte layer formed between the positive electrode active material layer and the negative electrode active material layer,
wherein the positive electrode active material or the negative electrode active material is the battery active material according to claim 1.

5. The battery according to claim 4, wherein x satisfies a relationship 0<x≤0.4.

6. The battery according to claim 4, wherein the negative electrode active material is the battery active material.

7. The battery according to claim 6, wherein x satisfies a relationship 0<x≤0.4.

8. The battery according to claim 6, wherein a content of the negative electrode active material in the negative electrode is in the range of 60 to 99%.

9. The battery active material according to claim 1, wherein a proportion of the crystal phase that is represented by the formula Y$_{2-x}$Sc$_x$Ti$_2$O$_5$S$_2$ included in the battery active material is equal to or larger than 50 mol %.

10. The battery active material according to claim 1, wherein a lithium insertion/extraction potential with respect to metal lithium is 1.5 V or less.

11. The battery active material according to claim 1, wherein an electron conductivity of the battery active material at room temperature is at least 10$^{-7}$ S/cm.

* * * * *